(12) United States Patent
Ren et al.

(10) Patent No.: US 12,131,401 B1
(45) Date of Patent: Oct. 29, 2024

(54) DUAL WATERMARKING METHOD FOR TRAJECTORY DATA BASED ON ROBUST WATERMARKING AND FRAGILE WATERMARKING

(71) Applicant: Nanjing Normal University, Nanjing (CN)

(72) Inventors: Na Ren, Nanjing (CN); Yuchen Hu, Nanjing (CN); Changqing Zhu, Nanjing (CN); Qianwen Zhou, Huaian (CN)

(73) Assignee: Nanjing Normal University, Nanjing (CN)

( * ) Notice: Subject to any disclaimer, the term of this patent is extended or adjusted under 35 U.S.C. 154(b) by 0 days.

(21) Appl. No.: 18/732,548

(22) Filed: Jun. 3, 2024

(30) Foreign Application Priority Data

Jun. 5, 2023 (CN) .......................... 202310652871.0

(51) Int. Cl.
    *G06T 1/00*     (2006.01)
    *G06F 21/60*     (2013.01)
(52) U.S. Cl.
    CPC ............ *G06T 1/005* (2013.01); *G06F 21/602* (2013.01); *G06T 1/0042* (2013.01); *G06T 2201/0064* (2013.01); *G06T 2201/0065* (2013.01)

(58) Field of Classification Search
    None
    See application file for complete search history.

(56) References Cited

U.S. PATENT DOCUMENTS

2009/0094265 A1*  4/2009  Vlachos .................. G06F 21/16
2015/0168538 A1*  6/2015  Bradley ................... G01S 5/18
                                           367/127

* cited by examiner

*Primary Examiner* — Leon Viet Q Nguyen

(57) ABSTRACT

A dual watermarking method for trajectory data based on robust watermarking and fragile watermarking uses an encryption algorithm to construct robust watermark information, and then a farthest pair of feature points in a minimum convex hull of is set as constant points. Further quantization index modulation technology is used to embed robust watermark information into angles constructed from feature points and constant points. Finally, the angles and distance ratios constructed by trajectory points and constant points are used to group trajectory points. Within each group, spatiotemporal attributes of the trajectory points are taken as fragile watermark bits to be embedded in the distance ratios constructed by the trajectory points. A process of watermark detection is consistent with the embedding of watermark information. Watermarks embedded in the trajectory data based on the dual watermarking method have high robustness against translation, rotation, and scaling attacks.

10 Claims, 5 Drawing Sheets

DUAL WATERMARKING METHOD FOR TRAJECTORY DATA BASED ON ROBUST WATERMARKING AND FRAGILE WATERMARKING

CROSS-REFERENCE TO RELATED APPLICATIONS

This application claims priority to Chinese Patent Application No. 202310652871.0, filed Jun. 5, 2023, which is herein incorporated by reference in its entirety.

TECHNICAL FIELD

The present disclosure relates to the technical field of geographic information security technology, in particular to a dual watermarking method for trajectory data based on robust watermarking and fragile watermarking.

BACKGROUND

In recent years, with the rapid development of satellite positioning technology, wireless mobile devices and tracking detection technology, massive trajectory data can be easily collected. Trajectory data is widely used in mobile navigation, intelligent transportation, urban travel behavior analysis, data mining and other research, but the trajectory data inevitably suffers from information security problems such as leakage, infringement and integrity damage in transmission, use and sharing of the trajectory data. Therefore, how to effectively protect the copyright of the trajectory data and how to verify the integrity of the trajectory data have become urgent problems to be solved.

Digital watermarking technology, as a cutting-edge technology in information security, has been widely applied and recognized in the copyright protection of geographic information data and other digital products. It can also be used to solve the problem of the copyright protection of the trajectory data.

Lucchese et al. (Lucchese C, Vlachos M, Rajan D, et al., "Rights protection of trajectory datasets with nearest-neighbor preservation [J]", Vldb Journal, 2010, 19(4): 531-556.) use a spread spectrum method to embed watermarks on multiple frequencies of an object and multiple dataset objects without affecting a neighborhood of each object. Yue Mingliang (Yue Mingliang, "Research on Copyright Protection and Integrity Verification of Geographic Data [D]", Wuhan University, 2015.) proposes a robust watermarking algorithm for trajectory data streams, which selects feature positions in a time window through a time interpolation method, and then embeds watermark information into a feature distance between the feature positions. Pan et al. (Pan Z, Bao J, Zhang W, et al., "TrajGuard: A Comprehensive Trajectory Copyright Protection Scheme [C]", the 25th ACM SIGKDD International Conference, ACM, 2019.) group trajectory data based on their spatiotemporal characteristics to resist cropping attacks, and then watermark information is embedded into distances between trajectory points and a centroid, combining it with blockchain technology.

The above algorithms are all research on robust watermarking for trajectory data, and fragile watermarking algorithms for trajectory data have also been studied. Wen Chunlei et al. (Wen Chunlei, "Research on Integrity Detection Methods for Trajectory Data [D]", Shihezi University, 2017.) first propose an integrity detection method for trajectory data, the integrity detection method uses a two-stage embedding method to embed group watermarks and trajectory point watermarks into trajectory data, which can effectively locate tampering positions for trajectory data and identify tampering types for trajectory data.

Although the above digital watermarking algorithms can effectively embed watermark information and resist various attacks, they can only achieve single protection and cannot perform copyright tracing and integrity verification simultaneously. At present, there is no method that simultaneously achieves copyright tracing and integrity verification of trajectory data, and the present disclosure can fill the blank in the field.

SUMMARY

In order to solve the above problems in the related art, the present disclosure provides a dual watermarking method for trajectory data based on robust watermarking and fragile watermarking. The dual watermarking method can solve the problems of illegal acquisition, copyright ownership, and temporal attribute tampering of trajectory data during transmission and use of the trajectory data. The dual watermarking method can simultaneously achieve copyright tracing and integrity verification of trajectory data, and watermarks embedded in the trajectory data have high robustness against translation, rotation, and scaling attacks.

According to a first scheme of the present disclosure, a dual watermarking method for trajectory data based on robust watermarking and fragile watermarking is provided. The dual watermarking method includes:
  acquiring a robust watermark;
  acquiring a fragile watermark;
  embedding the robust watermark, including:
    based on the robust watermark, setting a preset time threshold and a preset distance threshold for each trajectory of a trajectory dataset; and in response to a time difference between two trajectory points adjacent in time of the trajectory of the trajectory dataset being greater than the preset time threshold or a distance difference between the two trajectory points adjacent in time of the trajectory of the trajectory dataset being greater than the preset distance threshold, segmenting the trajectory into sub-trajectories;
    compressing each of the sub-trajectories of the trajectory dataset to obtain feature points of each trajectory of the trajectory dataset, thereby to obtain a feature point set FP of the trajectory dataset, calculating a minimum convex hull of the feature point set FP and obtaining a farthest pair of feature points in the minimum convex hull, setting feature points in the farthest pair of feature points as constant points, taking a feature point of the constant points with a smaller trajectory sequence number as a first constant point $p_f(x_f, y_f)$, and taking another feature point of the constant points as a second constant point $p_s(x_s, y_s)$;
    calculating each angle $\alpha$ defined by each feature point except the constant points in the feature point set FP, the first constant point $p_f$ and the second constant point $p_s$; and calculating each distance ratio r defined by each feature point except the constant points in the feature point set FP, the first constant point $p_f$ and the second constant point $p_s$;
    using each angle $\alpha$ and each distance ratio r as input values of a hash function to generate an index of a to-be-embedded robust watermark bit of each corresponding feature point except the constant points in the feature point set FP in the robust watermark $W_r$, and acquiring the to-be-embedded robust watermark bit of each corresponding feature point except the constant points in the feature point set IP according to the index; and embedding the to-be-embedded robust watermark bit of each corresponding feature point except the constant points in the feature point set FP into a δ-th decimal place of each angle α; and embedding the fragile watermark, including:

calculating each angle defined by each trajectory point of the trajectory dataset, the first constant point $p_f$, and the second constant point $p_s$; calculating each distance ratio defined by each trajectory point of the trajectory dataset, the first constant point $p_f$ and the second constant point $p_s$; combining each angle and each distance ratio to map each angle and each distance ratio on integers [1, k]; and grouping trajectory points of the trajectory dataset with a same mapping value into a corresponding one group to thereby obtain a grouping result $V=\{V_1, \ldots, V_k\}$ of the trajectory points of the trajectory dataset, where k represents the number of groups of the grouping result; and traversing each group of the grouping result V and embedding the fragile watermark into trajectory points in each group except the constant points.

In an embodiment, the acquiring a robust watermark includes:

acquiring an image with a size of n×n pixels;

encrypting the image to generate an encrypted image I; and converting two-dimensional data of the encrypted image I to a one-dimensional binary sequence, and taking the one-dimensional binary sequence as the robust watermark expressed as $W_r=\{w_r[i], 0 \leq i \leq j\}$; in the robust watermark, where $w_r[i] \in [0,1]$ and j=n*n, and j represents a length of the robust watermark.

In an embodiment, the acquiring a fragile watermark includes:

acquiring coordinates and time of trajectory points of each trajectory of the trajectory dataset;

concatenating the coordinates of the trajectory points of each trajectory of the trajectory dataset and generating integers $S_{cor}$ of the trajectory points of each trajectory of the trajectory dataset;

combining serial numbers and the time of the trajectory points of each trajectory of the trajectory dataset to respectively generate integers $S_{time}$; and taking the integers $S_{cor}$ and the integers $S_{time}$ as parameters of a hash function to generate the fragile watermark.

In an embodiment, the traversing each group of the grouping result V and embedding the fragile watermark into trajectory points in each group except the constant points includes:

sorting the trajectory points in each of the groups according to a chronological order; and when time of at least two trajectory points of the trajectory points in each of the groups is the same, sorting the at least two trajectory points with the same time of the trajectory points in each group according to an ascending order of trajectory sequence numbers of the at least two trajectory points, to thereby obtain sorted trajectory points in each group;

according to a sorted order of the sorted trajectory points in each of the groups, embedding a fragile watermark bit constructed from a previous trajectory point of the sorted trajectory points into a δ-th decimal place of a distance ratio of a next trajectory point of the sorted trajectory points; and for a first trajectory point of the sorted trajectory points, embedding a fragile watermark bit constructed from a last trajectory point of the sorted trajectory points into a δ-th decimal place of a distance ratio of the first trajectory point of the sorted trajectory points;

where a process of embedding a fragile watermark bit into a trajectory point $p_u(x_u, y_u)$ of the sorted trajectory points includes: calculating a distance ratio $r_f$ between a distance from the trajectory point $p_u$ to the first constant point $p_f$ and a distance from the first constant point $p_f$ to the second constant point $p_s$, and embedding the fragile watermark bit into the distance ratio $r_f$ to obtain a distance ratio r'.

In an embodiment, the dual watermarking method for trajectory data based on robust watermarking and fragile watermarking further includes: performing watermark detection after embedding the fragile watermark. A process of performing the watermark detection includes:

compressing each trajectory of the trajectory dataset after embedding the robust watermark and the fragile watermark to obtain a trajectory feature point set; calculating a minimum convex hull of the trajectory feature point set and obtaining a farthest pair of feature points in the minimum convex hull of the trajectory feature point set, setting the farthest pair of feature points of the trajectory feature point set as constant points of the trajectory feature point set, taking a feature point of the constant points of the trajectory feature point set with a smallest trajectory sequence number as a third constant point $p_f'$, and taking another feature point of the constant points of the trajectory feature point set as a fourth constant point $p_s'$;

traversing feature points of the trajectory feature point set to perform robust watermark detection;

calculating each angle defined by each trajectory point of the trajectory dataset after embedding the robust watermark and the fragile watermark, the third constant point $p_f'$, and the fourth constant point $p_s'$; calculating each distance ratio r" defined by each trajectory point of the trajectory dataset after embedding the robust watermark and the fragile watermark, the third constant point $p_f'$, and the fourth constant point $p_s'$; combining each angle and each distance ratio to map each angle and each distance ratio on integers [1, k]; and grouping trajectory points of the trajectory dataset after embedding the robust watermark and the fragile watermark with a same mapping value into a corresponding one group to thereby obtain a grouping result $V'=\{V_1', \ldots, V_k'\}$ of the trajectory points of the trajectory dataset after embedding the robust watermark and the fragile watermark; and traversing each group of the group result V' to perform fragile watermark detection.

In an embodiment, the traversing feature points of the trajectory feature point set to perform robust watermark detection includes:

calculating each angle α" defined by each feature point in the trajectory feature point set, the third constant point $p_f'$, and the fourth constant point $p_s'$; and calculating each distance ratio r" defined by each feature point in the trajectory feature point set, the third constant point $p_f'$, and the fourth constant point p's;

calculating an index index' of a robust watermark bit of each corresponding feature point based on each angle α" and each distance ratio r";

extracting the robust watermark bit of each corresponding feature point in the robust watermark embedded into a δ-th decimal place of each angle α" based on quantization index modulation technology;

performing a majority voting method based on the index index' of the robust watermark of each corresponding feature point and the robust watermark bit of each corresponding feature point to obtain an extracted robust watermark $W_r'$; and comparing a similarity between the robust watermark $W_r$ and the extracted robust watermark $W_r'$, and selecting a normalized correlation coefficient as an evaluation indicator; and when the normalized correlation coefficient is greater than or equal to 0.75, determining that data corresponding to the extracted robust watermark $W_r'$ is the same with data corresponding to the robust watermark $W_r$.

In an embodiment, a process of performing the fragile watermark detection includes:

sorting the trajectory points in each group corresponding to the trajectory dataset after embedding the robust watermark and the fragile watermark according to a chronological order; and when time of at least two trajectory points of the trajectory points in each of the groups corresponding to the trajectory dataset after embedding the robust watermark and the fragile watermark is the same, sorting the at least two trajectory points with the same time of the trajectory points according to an ascending order of trajectory sequence numbers of the at least two trajectory points;

calculating a fragile watermark bit $F_{bit}'$ and a distance ratio $r_f''$ detected at each of the trajectory points in each group corresponding to the trajectory dataset after embedding the robust watermark and the fragile watermark; and acquiring a value at a δ-th decimal place of the distance ratio $r_f''$, and calculating a fragile watermark bit $F_{bit}''$ embedded to the distance ratio $r_f''$; comparing the fragile watermark bit $F_{bit}'$ with the fragile watermark bit $F_{fit}''$, when the fragile watermark bit $F_{bit}'$ and the fragile watermark bit $F_{bit}''$ are different, determining that a trajectory point corresponding to the fragile watermark bit $F_{bit}'$ is tampered, recording the trajectory point corresponding to the fragile watermark bit $F_{bit}'$ and a group of the trajectory point corresponding to the fragile watermark bit $F_{bit}'$ to obtain a tampered position.

According to a second scheme of the present disclosure, a dual watermarking device for trajectory data based on robust watermarking and fragile watermarking is provided. The dual watermarking device includes a first acquiring part, configured to acquire a robust watermark;

a second acquiring part, configured to acquire a fragile watermark;

a first embedding part, configured to embed the robust watermark; where a process of embedding the robust watermark by the first embedding part includes:

based on the robust watermark, setting a preset time threshold and a preset distance threshold for each trajectory of a trajectory dataset; and in response to a time difference between two trajectory points adjacent in time of the trajectory of the trajectory dataset being greater than the preset time threshold or a distance difference between the two trajectory points adjacent in time of the trajectory of the trajectory dataset being greater than the preset distance threshold, segmenting the trajectory into sub-trajectories;

compressing each of the sub-trajectories of the trajectory dataset to obtain feature points of each trajectory of the trajectory dataset, thereby to obtain a feature point set FP of the trajectory dataset, calculating a minimum convex hull of the feature point set FP and obtaining a farthest pair of feature points in the minimum convex hull, setting feature points in the farthest pair of feature points as constant points, taking a feature point of the constant points with a smaller trajectory sequence number as a first constant point $p_f(x_f, y_f)$, and taking another feature point of the constant points as a second constant point $p_s(x_s, y_s)$;

calculating each angle α defined by each feature point except the constant points in the feature point set FP, the first constant point $p_f$, and the second constant point $p_s$; and calculating each distance ratio r defined by each feature point except the constant points in the feature point set FP, the first constant point $p_f$, and the second constant point $p_s$;

using each angle α and each distance ratio r as input values of a hash function to generate an index of a to-be-embedded robust watermark bit of each corresponding feature point except the constant points in the feature point set FP in the robust watermark $W_r$, and acquiring the to-be-embedded robust watermark bit of each corresponding feature point except the constant points in the feature point set/P according to the index; and embedding the to-be-embedded robust watermark bit of each corresponding feature point except the constant points in the feature point set FP into a δ-th decimal place of each angle α; and a second embedding part, configured to embed the fragile watermark; where a process of embedding the fragile watermark by the second embedding part includes:

calculating each angle defined by each trajectory point of the trajectory dataset, the first constant point $p_f$, and the second constant point $p_s$; calculating each distance ratio defined by each trajectory point of the trajectory dataset, the first constant point $p_f$, and the second constant point $p_s$; combining each angle and each distance ratio to map each angle and each distance ratio on integers [1, k]; and grouping trajectory points of the trajectory dataset with a same mapping value into a corresponding one group to thereby obtain a grouping result $V=\{V_1, \ldots, V_R\}$ of the trajectory points of the trajectory dataset, and k represents the number of groups of the grouping result; and traversing each group of the grouping result V and embedding the fragile watermark into trajectory points in each group except the constant points.

In an embodiment, the dual watermarking device further includes a watermark detection part configured to perform watermark detection. A process of performing the watermark detection by the watermark detection part includes:

compressing each trajectory of the trajectory dataset after embedding the robust watermark and the fragile watermark to obtain a trajectory feature point set; calculating a minimum convex hull of the trajectory feature point set and obtaining a farthest pair of feature points in the minimum convex hull of the trajectory feature point set, setting the farthest pair of feature points of the trajectory feature point set as constant points of the trajectory feature point set, taking a feature point of the constant points of the trajectory feature point set with a smallest trajectory sequence number as a third constant point $p_f'$, and taking another feature point of the constant points of the trajectory feature point set as a fourth constant point $p_s'$;

traversing feature points of the trajectory feature point set to perform robust watermark detection;

calculating each angle defined by each trajectory point of the trajectory dataset after embedding the robust watermark and the fragile watermark, the third constant point $p_f'$, and the fourth constant point $p_s'$; calculating each distance ratio r" defined by each trajectory point of the trajectory dataset after embedding the robust watermark and the fragile watermark, the third constant point $p_f'$, and the fourth constant point $p_s'$; combining each angle and each distance ratio to map each angle and each distance ratio on integers [1, k]; and grouping trajectory points of the trajectory dataset after embedding the robust watermark and the fragile watermark with a same mapping value into a corresponding one group to thereby obtain a grouping result $V' = \{V_1', \ldots, V_k'\}$ of the trajectory points of the trajectory dataset after embedding the robust watermark and the fragile watermark; and traversing each group of the group result V' to perform fragile watermark detection.

In a third scheme of the present disclosure, a non-transitory computer-readable storage medium stored with instructions is provided. When the instructions are executed by a processor, the above dual watermarking method for trajectory data based on robust watermarking and fragile watermarking is performed.

The dual watermarking method for trajectory data based on robust watermarking and fragile watermarking provided by the present disclosure fully uses organizational characteristics of trajectory data, uses a stable grouping method, and selects angles and distance ratios to embed dual watermark information, thereby effectively avoiding mutual interference during dual watermark embedding. In addition, due to the strong robustness of the angles and the distance ratios against rotation, translation, and scaling attacks, the dual watermarking device for trajectory data based on robust watermarking and fragile watermarking provided by the present disclosure can resist almost all common types of attacks.

BRIEF DESCRIPTION OF DRAWINGS

In drawings that may not necessarily be drawn to scale, same reference numerals of the drawings may be used to describe similar components in different views. The same reference numerals with a letter suffix or different letter suffixes can represent different instances of similar components. The drawings generally illustrate various embodiments by way of example rather than limitation, and are used together with the specification and claims to illustrate the embodiments of the present disclosure. When appropriate, the same reference numerals in all drawings are used to refer to the same or similar parts. Such embodiments are illustrative and not intended as a limitation of embodiments of the present disclosure.

DETAILED DESCRIPTION OF EMBODIMENTS

Figure 1:
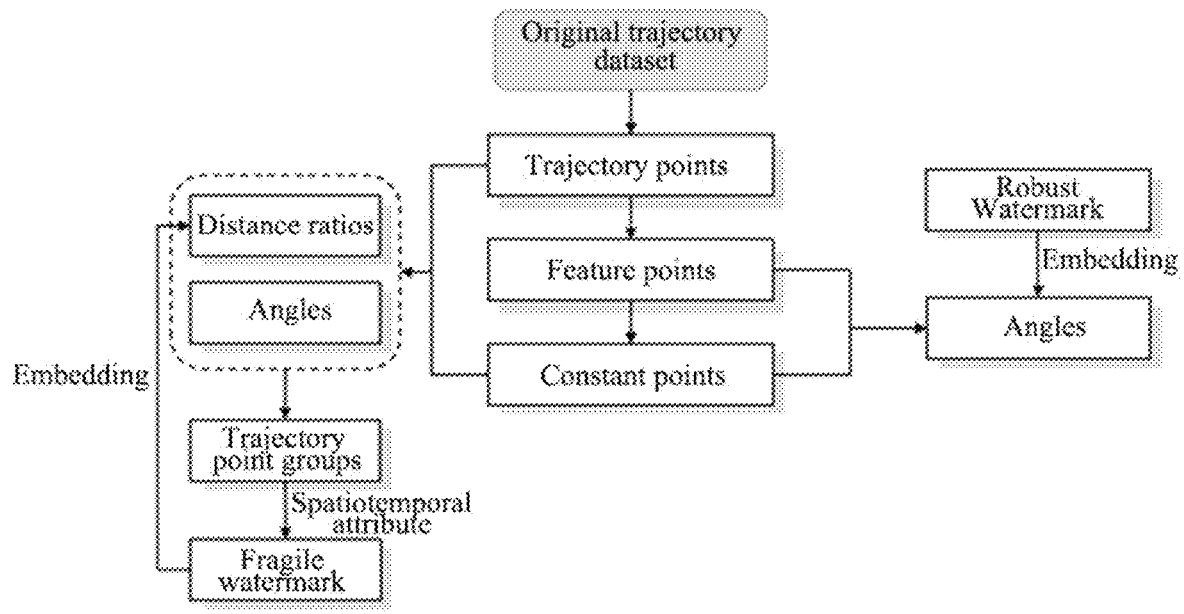
FIG. 1 illustrates a flowchart of a dual watermarking method for trajectory data based on robust watermarking and fragile watermarking provided by the present disclosure.

In order to help those skilled in the art better understand the technical solutions of the present disclosure, the following provides a further detailed description of the embodiments of the present disclosure in conjunction with the drawings and specific embodiments, but does not serve as a limitation of the present disclosure. If steps described in the disclosure are not necessarily related to each other, orders of the steps described in the present disclosure should not be considered a limitation. Those skilled in the art should know that the orders of the steps can be adjusted as long as a logical relationship among the steps is not disrupted and the orders of the steps make the present disclosure possible to be implemented.

To solve the problems of illegal acquisition, copyright ownership, and temporal attribute tampering of trajectory data during transmission and use of the trajectory data, an embodiment of the present disclosure provides a dual watermarking method for trajectory data based on robust watermarking and fragile watermarking.

The dual watermarking method of the present disclosure constructs a grouping mechanism that can resist rotation, translation, and scaling attacks through trajectory angles and distance ratios. To meet different requirements of dual watermarking for trajectory data, a robust watermark is embedded into feature points, and then a fragile watermark is embedded into trajectory points of each group based on the grouping mechanism. In addition, to avoid mutual interference during dual watermark embedding and improve the robustness of the algorithm, watermark information (also referred to as watermark bits) is embedded into angles and distance ratios constructed by trajectory points. When the angles and the distance ratios remain unchanged or does not significantly change, the watermark information can be accurately extracted, and the grouping mechanism can also obtain tampered positions for fragile watermarks.

The basic idea of the dual watermarking method is as follows. Firstly, an encryption algorithm is used to construct robust watermark information, and then the farthest pair of feature points in a minimum convex hull is set as constant points. Then, quantization index modulation (QIM) technology is used to embed the robust watermark into angles constructed from feature points and constant points. Finally, the angles and distance ratios constructed by trajectory points and constant points are grouped. In each of groups, spatiotemporal attributes of trajectory points are mapped as a fragile watermark and the fragile watermark is embedded in the distance ratios constructed by trajectory points. A process of the watermark detection is similar with a process of embedding the watermark information. Robust watermark detection requires a similarity verification between an extracted watermark and an original robust watermark to determine copyright ownership. Fragile watermark detection requires comparing an extracted fragile watermark with an original fragile watermark to determine whether data has changed and where the changes occur.

Based on the above basic idea, as shown in FIG. 1, the dual watermarking method specifically includes steps 1 to 4.

In step 1, a robust watermark is generated.

In some embodiments, the step 1 includes step 1.1, step 1.2, and step 1.3.

In the step 1.1, an image with a size of n×n pixels and copyright information is selected.

In the step 1.2, a Logistic encryption algorithm is used to encrypt the image thereby generating an encrypted image/.

In the step 1.3, two-dimensional data of the encrypted image is converted to a one-dimensional binary sequence, and the one-dimensional binary sequence is taken as the robust watermark expressed as $W_r = \{w_r[i], 0 \leq i \leq j\}$. In the robust watermark, $w_r[i] \in [0,1]$ and $j = n*n$, and j represents a length of the robust watermark.

In the step 2, a fragile watermark is generated.

In some embodiments, the step 2 includes step 2.1, step 2.2, step 2.3, and step 2.4.

In the step 2.1, coordinates and time of trajectory points of each trajectory of the trajectory dataset are acquired.

In the step 2.2, the coordinates of the trajectory points of each trajectory of the trajectory dataset are concatenated and integers $S_{cor}$ of the trajectory points of each trajectory of the trajectory dataset are generated.

In the step 2.3, serial numbers and the time of the trajectory points of each trajectory of the trajectory dataset are combined to respectively generate integers $S_{time}$.

In the step 2.4, the integers $S_{cor}$ and the integers $S_{time}$ are taken as parameters of a hash function to generate the fragile watermark.

In the step 3, the robust watermark is embedded.

In some embodiments, the step 3 includes step 3.1 to step 3.6.

In the step 3.1, a preset time threshold and a preset distance threshold are set for each trajectory of a trajectory dataset. When a time difference between two trajectory points adjacent in time of the trajectory of the trajectory dataset is greater than the preset time threshold or a distance difference between the two trajectory points adjacent in time of the trajectory of the trajectory dataset is greater than the preset distance threshold, the trajectory is segmented into sub-trajectories.

In the step 3.2, a light bar method is used to compress each of the sub-trajectories of the trajectory dataset to obtain feature points of each trajectory of the trajectory dataset, thereby to obtain a feature point set FP of the trajectory dataset.

In the step 3.3, a minimum convex hull of the feature point set FP is calculated to obtain a farthest pair of feature points in the minimum convex hull. Feature points in the farthest pair of feature points are set as constant points. A feature point of the constant points with a smaller trajectory sequence number is taken as a first constant point $p_f(x_f, y_f)$, and another feature point of the constant points is taken as a second constant point $p_s(x_s, y_s)$.

In the step 3.4, each angle α defined by each feature point except the constant points in the feature point set FP, the first constant point $p_f$ and the second constant point $p_s$ is calculated. Each distance ratio r defined by each feature point except the constant points in the feature point set FP, the first constant point $p_f$ and the second constant point $p_s$ is calculated.

In the step 3.5, each angle α and each distance ratio r are used as input values of a hash function to generate an index of a to-be-embedded robust watermark bit of each corresponding feature point except the constant points in the feature point set FP in the robust watermark $W_r$. Then, the to-be-embedded robust watermark bit of each corresponding feature point except the constant points in the feature point set FP is acquired according to the index.

In the step 3.6, quantization index modulation technology is used to embed the to-be-embedded robust watermark bit of each corresponding feature point except the constant points in the feature point set FP into a δ-th decimal place of each angle α.

In the step 4, the fragile watermark is embedded. The step 4 includes step 4.1 and step 4.2.

In the step 4.1, each angle defined by each trajectory point of the trajectory dataset, the first constant point $p_f$ and the second constant point $p_s$ is calculated. Each distance ratio defined by each trajectory point of the trajectory dataset, the first constant point $p_f$ and the second constant point $p_s$ is calculated. Each angle and each distance ratio are combined to map each angle and each distance ratio on integers [1, k]. Trajectory points of the trajectory dataset with a same mapping value are grouped into a corresponding one group to obtain a grouping result $V = \{V_1, \ldots, V_k\}$ of the trajectory points of the trajectory dataset, and k represents the number of groups of the grouping result.

In the step 4.2, each group of the grouping result V is traversed to embed the fragile watermark into trajectory points in each group except the constant points.

In some embodiments, the step 4.2 includes step 4.2.1, step 4.2.2, and step 4.2.3.

In the step 4.2.1, the trajectory points in each of the groups are sorted according to a chronological order. When time of at least two trajectory points of the trajectory points in each of the groups is the same, the at least two trajectory points with the same time of the trajectory points in each group are sorted according to an ascending order of trajectory sequence numbers of the at least two trajectory points, thereby obtaining sorted trajectory points in each group.

In the step 4.2.2, according to a sorted order of the sorted trajectory points in each of the groups, a fragile watermark bit constructed from a previous trajectory point of the sorted trajectory points is embedded into a δ-th decimal place of a distance ratio of a next trajectory point of the sorted trajectory points. For a first trajectory point of the sorted trajectory points, a fragile watermark bit constructed from a last trajectory point of the sorted trajectory points is embedded into a δ-th decimal place of a distance ratio of the first trajectory point of the sorted trajectory points.

Specifically, a trajectory point $p_u(x_u, y_u)$ is taken to describe the step 4.22 clearly. A process of embedding a fragile watermark bit into the trajectory point $p_u(x_u, y_u)$ of the sorted order includes: calculating a distance ratio $r_f$ between a distance from the trajectory point $p_u$ to the first constant point $p_f$ and a distance from the first constant point $p_u$ to the second constant point $p_s$, and embedding the fragile watermark bit into the distance ratio $r_f$ to obtain a distance ratio $r_f'$.

In the step 4.2.3, the step 4.2.2 is repeated to embed each fragile watermark bit to each corresponding trajectory point of the sorted order.

In some embodiments, the dual watermarking method for trajectory data based on robust watermarking and fragile watermarking further includes step 5. The step 5 is watermark detection.

Figure 2:
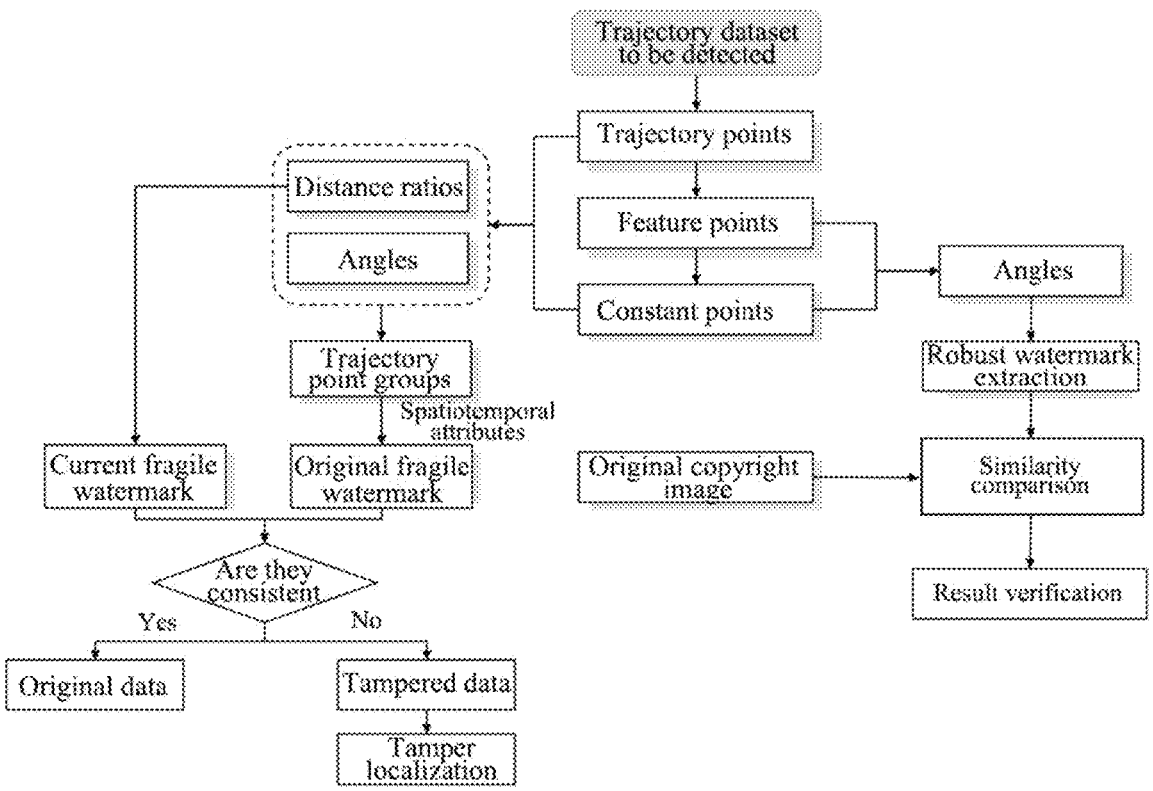
FIG. 2 illustrates a flowchart of watermark detection in an embodiment of the present disclosure.

As shown in FIG. 2, the step 5 includes step 5.1, step 5.2, step 5.3, and step 5.4.

In the step 5.1, the light bar method is used to compress each trajectory of the trajectory dataset after embedding the robust watermark and the fragile watermark to obtain a trajectory feature point set. A minimum convex hull of the trajectory feature point set is calculated to obtain a farthest pair of feature points in the minimum convex hull of the trajectory feature point set. The farthest pair of feature points of the trajectory feature point set is set as constant points of the trajectory feature point set. A feature point of the constant points of the trajectory feature point set with a smallest trajectory sequence number is taken as a third constant point $p_f'$, and another feature point of the constant points of the trajectory feature point set is taken as a fourth constant point $p_s'$.

In the step 5.2, all feature points of the trajectory feature point set are traversed to perform robust watermark detection.

In some embodiments, the step 5.2 includes step 5.2.1, step 5.2.2, step 5.2.3, step 5.2.4, and step 5.2.5.

In the step 5.2.1, each angle α" defined by each feature point in the trajectory feature point set, the third constant point $p_f'$, and the fourth constant point $p_s'$ is calculated. Each distance ratio r" defined by each feature point in the trajectory feature point set, the third constant point $p_f'$, and the fourth constant point $p_s'$ is calculated.

Furthermore, each distance ratio r" is a ratio between a third distance (i.e., a distance from each corresponding feature point except the constant points in the feature point set FP to the third constant point $p_f'$) and a fourth distance (i.e., a distance from the third constant point $p_f'$ to the fourth constant point $p_s'$). Correspondingly, each angle α" is an angle between the third distance the fourth distance.

In the step 5.2.2, an index index' of a robust watermark bit of each corresponding feature point is calculated based on each angle α" and each distance ratio r".

In the step 5.2.3, the robust watermark bit of each corresponding feature point in the robust watermark embedded into a δ-th decimal place of each angle α" is extracted based on quantization index modulation technology.

In the step 5.2.4, a majority voting method is performed on the index index' of the robust watermark of each corresponding feature point and the robust watermark bit of each corresponding feature point to obtain an extracted robust watermark $W_r'$.

In the step 5.2.5, a similarity between the robust watermark $W_r$ and the extracted robust watermark $W_r'$ is compared. A normalized correlation coefficient is selected as an evaluation indicator of the similarity. When the normalized correlation coefficient is greater than or equal to 0.75, determining that data corresponding to the extracted robust watermark $W_r'$ is the same with data corresponding to the robust watermark $W_r$.

In the step 5.3, each angle defined by each trajectory point of the trajectory dataset after embedding the robust watermark and the fragile watermark, the third constant point p', and the fourth constant point p' is calculated. Each distance ratio r'" defined by each trajectory point of the trajectory dataset after embedding the robust watermark and the fragile watermark, the third constant point $p_f'$, and the fourth constant point $p_s'$ is calculated. Each angle and each distance ratio are combined to map each angle and each distance ratio on integers [1, k]. Trajectory points of the trajectory dataset after embedding the robust watermark and the fragile watermark with a same mapping value are grouped into a corresponding one group, thereby obtaining a grouping result $V'=\{V_1', \ldots, V_k'\}$ of the trajectory points of the trajectory dataset after embedding the robust watermark and the fragile watermark.

In the step 5.4, the fragile watermark detection is performed. Specifically, the step 5.4 includes step 5.4.1, step 5.4.2, and step 5.4.3.

In the step 5.4.1, the trajectory points in each group corresponding to the trajectory dataset after embedding the robust watermark and the fragile watermark are sorted according to a chronological order. When time of at least two trajectory points of the trajectory points in each of the groups corresponding to the trajectory dataset after embedding the robust watermark and the fragile watermark is the same, the at least two trajectory points with the same time of the trajectory points are sorted according to an ascending order of trajectory sequence numbers of the at least two trajectory points.

In the step 5.4.2, a fragile watermark bit $F_{bit}'$ and a distance ratio $r_f'''$ detected at each of the trajectory points in each group corresponding to the trajectory dataset after embedding the robust watermark and the fragile watermark.

In the step 5.4.3, a value at a δ-th decimal place of the distance ratio $r_f'''$ is acquired, and a fragile watermark bit $F_{bit}'''$ embedded into the distance ratio $r_f'''$ is calculated. The fragile watermark bit $F_{bit}'$ is compared with the fragile watermark bit $F_{bit}'''$. When the fragile watermark bit $F_{bit}'$ and the fragile watermark bit $F_{bit}'''$ are different, a trajectory point corresponding to the fragile watermark bit $F_{bit}'$ is determined to be tampered, then the trajectory point corresponding to the fragile watermark bit $F_{bit}'$ and a group of the trajectory point corresponding to the fragile watermark bit $F_{bit}'$ are recorded to obtain a tampered position.

The dual watermarking method for trajectory data based on robust watermarking and fragile watermarking provided by the present disclosure fully uses organizational characteristics of trajectory data, uses a stable grouping method, and selects angles and distance ratios to embed dual watermark information, thereby effectively avoiding mutual interference during dual watermark embedding. In addition, due to the strong robustness of the angles and the distance ratios against rotation, translation, and scaling attacks, the dual watermarking device for trajectory data based on robust watermarking and fragile watermarking provided by the present disclosure can resist almost all common types of attacks.

Figure 3:
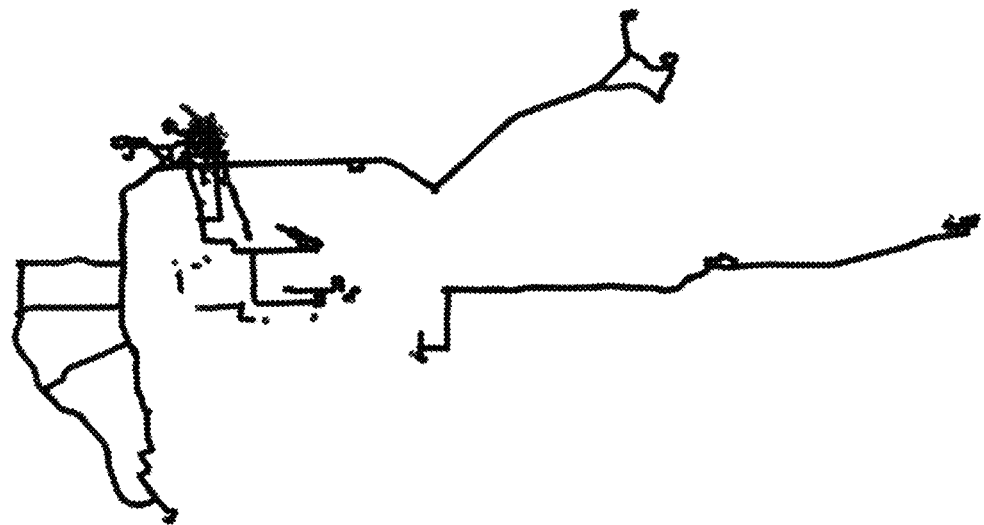
FIG. 3 illustrates trajectory data in an embodiment of the present disclosure.

In a specific embodiment, a trajectory dataset containing 663 trajectories is selected as shown in FIG. 3. Processes of generating, embedding, and detecting watermark information will be explained in the specific embodiment in detail.

Based on the trajectory dataset, the dual watermarking method for trajectory data based on robust watermarking and fragile watermarking includes the steps 1 to 3.

In the step 1, watermark information is generated. Specifically, the step 1 includes step 1.1 and step 1.2.

In the step 1.1, a Logistic encryption algorithm is used to encrypt an image having copyright, thereby generating an encrypted image.

In the step 1.2, two-dimensional data of the encrypted image is converted to a one-dimensional binary sequence.

In the step 2, watermark information is embedded. Specifically, the step 2 includes step 2.1, step 2.2, and step 2.3.

In the step 2.1, trajectory points of the trajectory dataset are extracted to obtain feature points, and constant points are calculated based on the feature points.

In the step 2.2, the binary sequence is embedded into angles constructed by feature points.

In the step 2.3, trajectory points are grouped based on angles and distance ratios. Trajectory points in each of groups are sorted, and time attributes of a previous trajectory point in the sorted group is taken as a fragile watermark bit. Then, the fragile watermark bit is embedded in a distance ratio of a current trajectory point in the sorted group.

In the step 3, watermark information is detected. Specifically, the step 3 includes step 3.1, step 3.2, and step 3.3. Before performing the step 3, it is noted that the trajectory dataset has been embedded with the robust watermark and the fragile watermark after performing the step 2.

In the step 3.1, trajectory points of the trajectory dataset are extracted to obtain feature points, and constant points are calculated based on the feature points.

In the step 3.2, robust watermark bits embedded in values of angles of feature points are acquired, and the robust watermark bits are decrypted to obtain copyright information.

In the step 3.3, the trajectory points are grouped based angles and distance ratios. Trajectory points in each of groups are sorted. After sorting the trajectory points, a fragile watermark bit mapped from time attributes of a sorted previous trajectory point is compared with a fragile watermark bit extracted from a distance ratio constructed from a sorted current trajectory point. When the two fragile watermark bits are different, the trajectory point is considered to be tampered and a position of the tampering is determined.

The test and analysis results are as follows. The dual watermarking method can solve the problems of illegal acquisition, copyright ownership, and temporal attribute tampering of trajectory data during transmission and use of the trajectory data. The dual watermarking method can simultaneously achieve copyright tracing and integrity verification of trajectory data, and watermarks embedded in the trajectory data have high robustness against translation, rotation, and scaling attacks.

Figure 4:
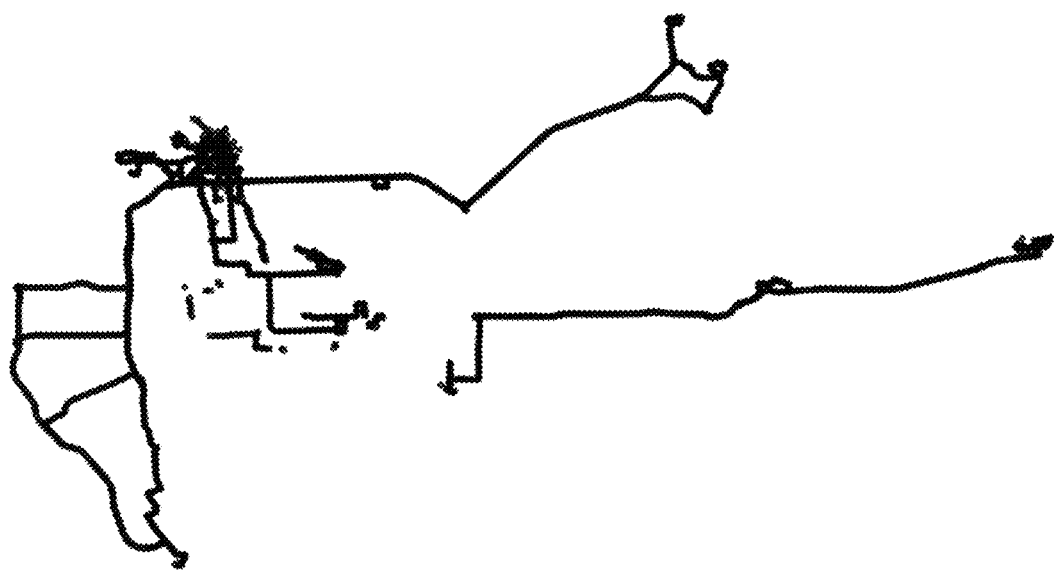
FIG. 4 illustrates trajectory data embedded with watermarks in the embodiment of the present disclosure.
Figure 5A:
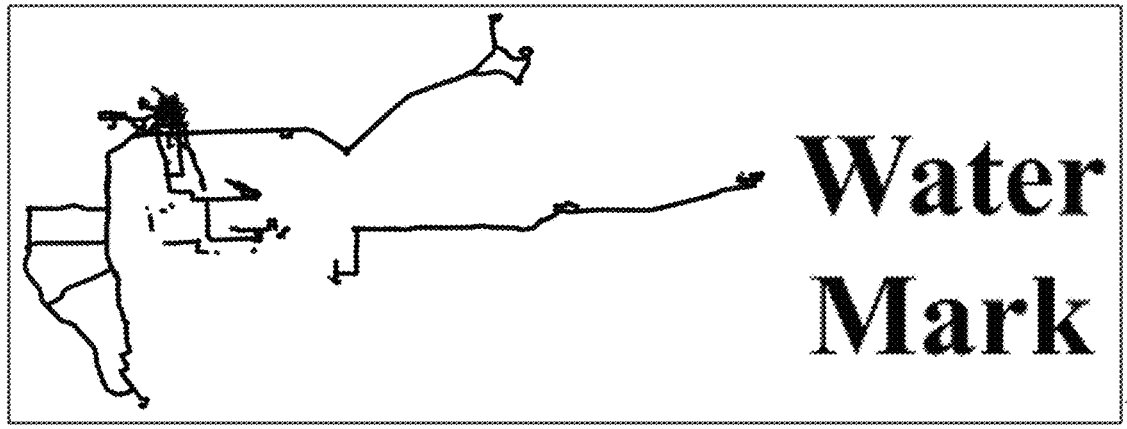
FIG. 5a illustrates a detection result and trajectory data after performing a global translation attack on the trajectory data embedded with watermarks in the embodiment of the present disclosure.
Figure 5B:
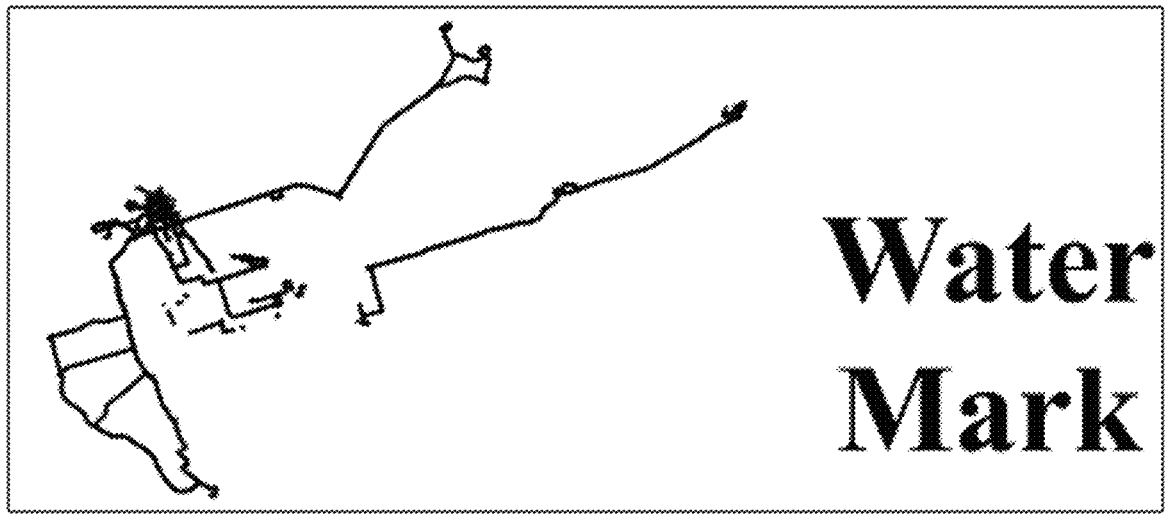
FIG. 5b illustrates a detection result and trajectory data after performing a global rotation attack on the trajectory data embedded with watermarks in the embodiment of the present disclosure.
Figure 5C:
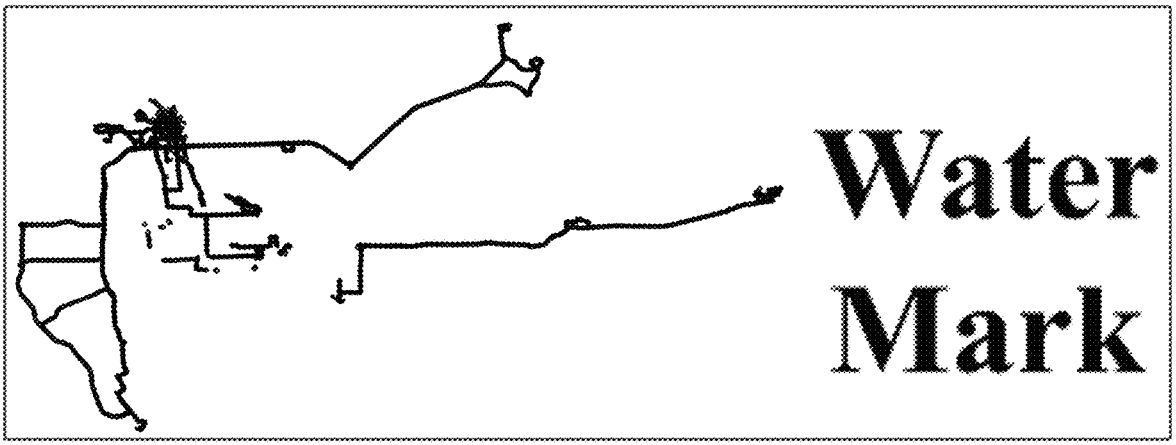
FIG. 5c illustrates a detection result and trajectory data after performing a global scaling attack on the trajectory data embedded with watermarks in the embodiment of the present disclosure.
Figure 5D:
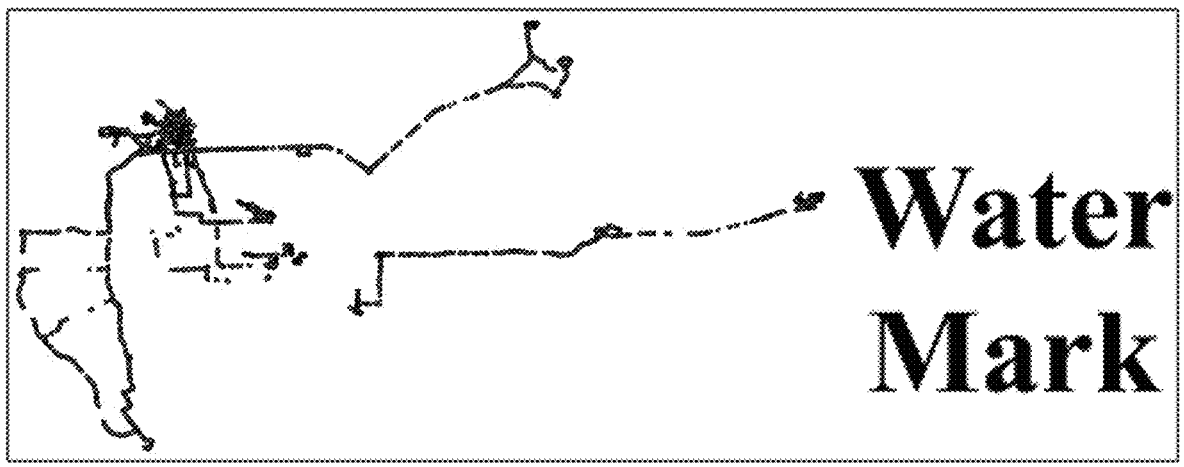
FIG. 5d illustrates a detection result and trajectory data after performing a data compression attack on the trajectory data embedded with watermarks in the embodiment of the present disclosure.
Figure 5E:
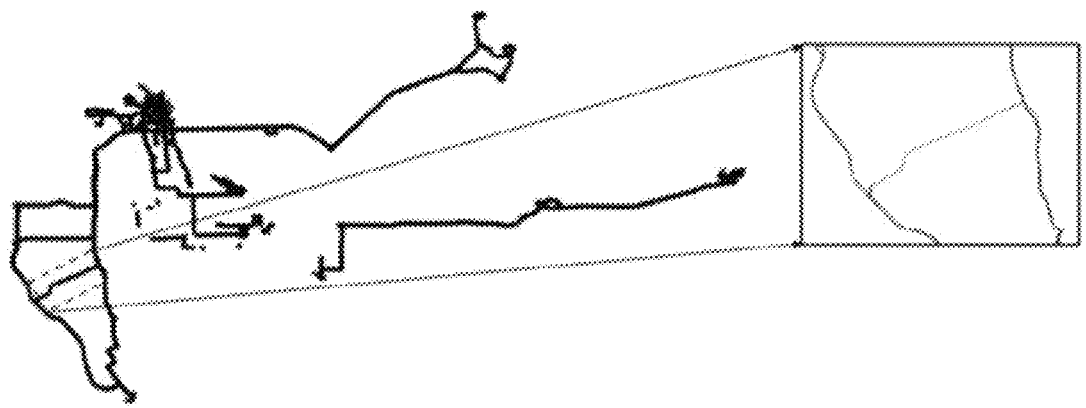
FIG. 5e illustrates a detection result and trajectory data after performing a data deletion attack on the trajectory data embedded with watermarks in the embodiment of the present disclosure.
Figure 5F:
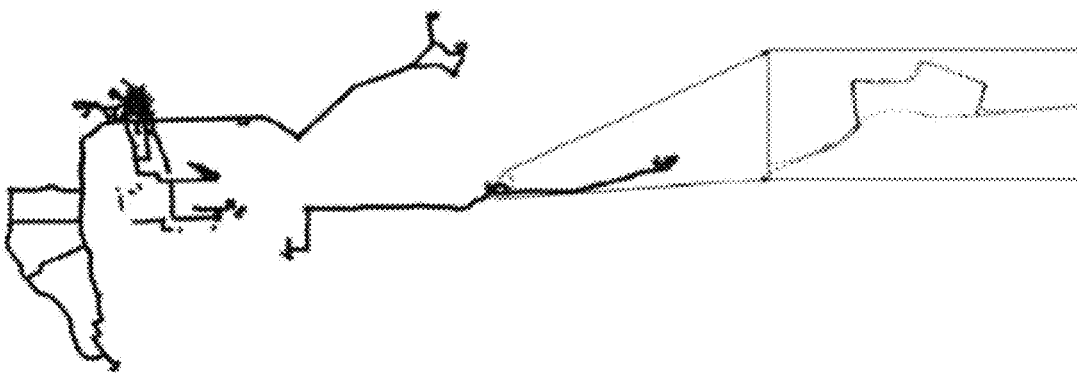
FIG. 5f illustrates a detection result and trajectory data after performing a temporal noise attack on the trajectory data embedded with watermarks in the embodiment of the present disclosure.

As shown in FIG. 4, a detection result of embedding a watermark is as follows: copyright information to be embedded is "WaterMark", and watermark detection is performed on trajectory data after embedding the watermark. The test result shows that the dual watermarking method of the present disclosure can accurately detect watermark information in the data.

As shown in FIG. 5a through FIG. 5f, a result of an anti-modification attack test shows that the modification attack on trajectory data refers to intentional or unintentional modification of the trajectory data. The modification attack includes global translation, global rotation, global scaling, trajectory compression, temporal noise, trajectory deletion, and so on. The test result shows that the dual watermarking method can accurately detect correct watermark information in the trajectory dataset suffering from different types of attacks, thereby effectively protecting the copyright information of the trajectory data. The dual watermarking method can also verify and locate tampering positions caused by time modification attacks.

Figure 6:
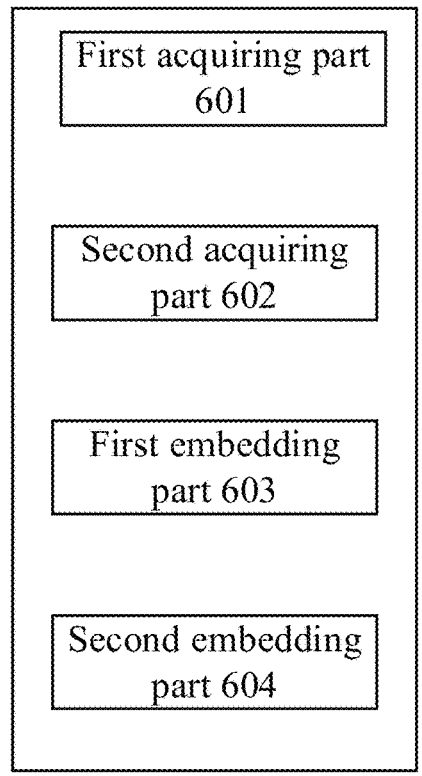
FIG. 6 illustrates a structural diagram of a dual watermarking device for trajectory data based on robust watermarking and fragile watermarking in the embodiment of the present disclosure.
Figure 7:
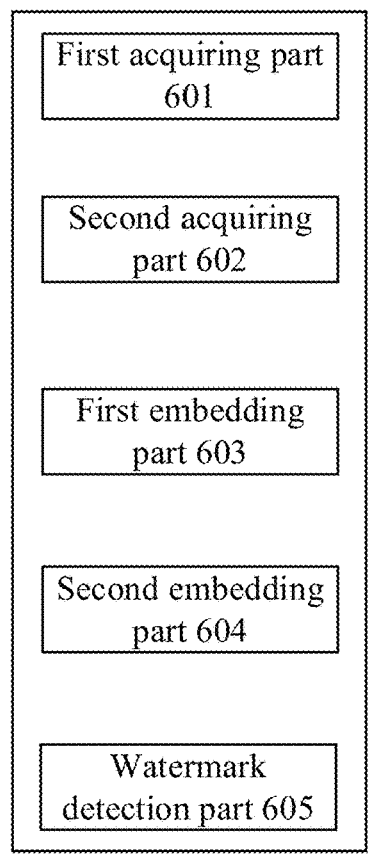
FIG. 7 illustrates another structural diagram of a dual watermarking device for trajectory data based on robust watermarking and fragile watermarking in an embodiment of the present disclosure.

The present disclosure further includes a dual watermarking device for trajectory data based on robust watermarking and fragile watermarking. As shown in FIG. 6, the dual watermarking device includes a first acquiring part 601 configured to acquire a robust watermark, a second acquiring part 602 configured to acquire a fragile watermark, a first embedding part 603 configured to embed the robust watermark, and a second embedding part 604 configured to embed the fragile watermark. In some embodiments, the first acquiring part 601, the second acquiring part 602, the first embedding part 603, and the second embedding part 604 are embodied by a software stored in at least one memory and executable by at least one processor.

A process of embedding the robust watermark by the first embedding part 603 includes:

based on the robust watermark, setting a preset time threshold and a preset distance threshold for each trajectory of a trajectory dataset; and in response to a time difference between two trajectory points adjacent in time of the trajectory of the trajectory dataset being greater than the preset time threshold or a distance difference between the two trajectory points adjacent in time of the trajectory of the trajectory dataset being greater than the preset distance threshold, segmenting the trajectory into sub-trajectories;

compressing each of the sub-trajectories of the trajectory dataset to obtain feature points of each trajectory of the trajectory dataset, thereby to obtain a feature point set FP of the trajectory dataset, calculating a minimum convex hull of the feature point set FP and obtaining a farthest pair of feature points in the minimum convex hull, setting feature points in the farthest pair of feature points as constant points, taking a feature point of the constant points with a smaller trajectory sequence number as a first constant point $p_f(x_f, y_f)$, and taking another feature point of the constant points as a second constant point $p_s(x_s, y_s)$;

calculating each angle α defined by each feature point except the constant points in the feature point set FP, the first constant point $p_f$, and the second constant point $p_s$; and calculating each distance ratio r defined by each feature point except the constant points in the feature point set FP, the first constant point $p_s$, and the second constant point $p_s$;

using each angle α and each distance ratio r as input values of a hash function to generate an index of a to-be-embedded robust watermark bit of each corresponding feature point except the constant points in the feature point set FP in the robust watermark $W_r$, and acquiring the to-be-embedded robust watermark bit of each corresponding feature point except the constant points in the feature point set FP according to the index; and embedding the to-be-embedded robust watermark bit of each corresponding feature point except the constant points in the feature point set FP into a δ-th decimal place of each angle α.

Furthermore, each distance ratio r is a ratio between a first distance $d_{tf}$ (i.e., a distance from each corresponding feature point except the constant points in the feature point set FP to the first constant point $p_f$) and a second distance $d_{fs}$ (i.e., a distance from the first constant point $p_f$ to the second constant point $p_s$). Correspondingly, each angle α is an angle between the first distance $d_{tf}$ and the second distance $d_{fs}$.

A process of embedding the fragile watermark by the second embedding part 604 includes:

calculating each angle defined by each trajectory point of the trajectory dataset, the first constant point $p_f$, and the second constant point $p_s$; calculating each distance ratio defined by each trajectory point of the trajectory dataset, the first constant point $p_f$, and the second constant point $p_s$; combining each angle and each distance ratio to map each angle and each distance ratio on integers [1, k]; and grouping trajectory points of the trajectory dataset with a same mapping value into a corresponding one group to thereby obtain a grouping result $V=\{V_1, \ldots, V_k\}$ of the trajectory points of the trajectory dataset, and k represents the number of groups of the grouping result; and traversing each group of the grouping result V and embedding the fragile watermark into trajectory points in each group except the constant points.

In some embodiments, the dual watermarking device further includes a watermark detection part 605 configured to perform watermark detection. A process of performing the watermark detection by the watermark detection part 605 includes:

compressing each trajectory of the trajectory dataset after embedding the robust watermark and the fragile watermark to obtain a trajectory feature point set; calculating a minimum convex hull of the trajectory feature point set and obtaining a farthest pair of feature points in the minimum convex hull of the trajectory feature point set, setting the farthest pair of feature points of the trajectory feature point set as constant points of the trajectory feature point set, taking a feature point of the constant points of the trajectory feature point set with a smallest trajectory sequence number as a third constant point $p_f'$, and taking another feature point of the constant points of the trajectory feature point set as a fourth constant point $p_s'$;

traversing feature points of the trajectory feature point set to perform robust watermark detection;

calculating each angle defined by each trajectory point of the trajectory dataset after embedding the robust watermark and the fragile watermark, the third constant point $p_f'$, and the fourth constant point $p_s'$; calculating each distance ratio r" defined by each trajectory point of the trajectory dataset after embedding the robust watermark and the fragile watermark, the third constant point $p_f'$, and the fourth constant point $p_s'$; combining each angle and each distance ratio to map each angle and each distance ratio on integers [1, k]; and grouping trajectory points of the trajectory dataset after embedding the robust watermark and the fragile watermark with a same mapping value into a corresponding one group to thereby obtain a grouping result $V'=\{V_1', \ldots, V_k'\}$ of the trajectory points of the trajectory dataset after embedding the robust watermark and the fragile watermark; and traversing each group of the group result V' to perform fragile watermark detection.

In some embodiment, a process of acquiring a robust watermark by the first acquiring part 601 includes:

acquiring an image with a size of n×n pixels;

encrypting the image to generate an encrypted image I; and converting two-dimensional data of the encrypted image I to a one-dimensional binary sequence, and taking the one-dimensional binary sequence as the robust watermark expressed as $W_r=\{w_r[i], 0 \le i \le j\}$; in the robust watermark, where $w_r[i] \in [0,1]$ and j=n*n, and j represents a length of the robust watermark.

In some embodiments, a process of acquiring a fragile watermark by the second acquiring part 602 includes:

acquiring coordinates and time of trajectory points of each trajectory of the trajectory dataset;

concatenating the coordinates of the trajectory points of each trajectory of the trajectory dataset and generating integers $S_{cor}$ of the trajectory points of each trajectory of the trajectory dataset;

combining serial numbers and the time of the trajectory points of each trajectory of the trajectory dataset to respectively generate integers $S_{time}$; and taking the integers $S_{cor}$ and the integers $S_{time}$ as parameters of a hash function to generate the fragile watermark.

In some embodiments, the first embedding part is further configured for:

sorting the trajectory points in each of the groups according to a chronological order; and when time of at least two trajectory points of the trajectory points in each of the groups is the same, sorting the at least two trajectory points with the same time of the trajectory points in each group according to an ascending order of trajectory sequence numbers of the at least two trajectory points, to thereby obtain sorted trajectory points in each group;

according to a sorted order of the sorted trajectory points in each of the groups, embedding a fragile watermark bit constructed from a previous trajectory point of the sorted trajectory points into a δ-th decimal place of a distance ratio of a next trajectory point of the sorted trajectory points; and for a first trajectory point of the sorted trajectory points, embedding a fragile watermark bit constructed from a last trajectory point of the sorted trajectory points into a δ-th decimal place of a distance ratio of the first trajectory point of the sorted trajectory points;

where a process of embedding a fragile watermark bit into a trajectory point $p_u(x_u, y_u)$ of the sorted trajectory points includes: calculating a distance ratio $r_f$ between a distance from the trajectory point $p_u$ to the first constant point $p_f$ and a distance from the first constant point $p_f$ to the second constant point $p_s$, and embedding the fragile watermark bit into the distance ratio r to obtain a distance ratio $r_f'$.

In some embodiments, the watermark detection part is further configured for:

calculating each angle α" defined by each feature point in the trajectory feature point set, the third constant point $p_f'$, and the fourth constant point $p_s'$; and calculating each distance ratio r" defined by each feature point in the trajectory feature point set, the third constant point $p_f'$, and the fourth constant point $p_s'$;

calculating an index index' of a robust watermark bit of each corresponding feature point based on each angle α" and each distance ratio r";

extracting the robust watermark bit of each corresponding feature point in the robust watermark embedded into a δ-th decimal place of each angle α" based on quantization index modulation technology;

performing a majority voting method based on the index index' of the robust watermark of each corresponding feature point and the robust watermark bit of each corresponding feature point to obtain an extracted robust watermark $W_r'$; and comparing a similarity between the robust watermark $W_r$, and the extracted robust watermark $W_r'$, and selecting a normalized correlation coefficient as an evaluation indicator; and when the normalized correlation coefficient is greater than or equal to 0.75, determining that data corresponding to the extracted robust watermark $W_r'$ is the same with data corresponding to the robust watermark $W_r$.

In some embodiments, the watermark detection part is further configured for:

sorting the trajectory points in each group corresponding to the trajectory dataset after embedding the robust watermark and the fragile watermark according to a chronological order; and when time of at least two trajectory points of the trajectory points in each of the groups corresponding to the trajectory dataset after embedding the robust watermark and the fragile watermark is the same, sorting the at least two trajectory points with the same time of the trajectory points according to an ascending order of trajectory sequence numbers of the at least two trajectory points;

calculating a fragile watermark bit $F_{bit}'$ and a distance ratio $r_f''$ detected at each of the trajectory points in each group corresponding to the trajectory dataset after embedding the robust watermark and the fragile watermark; and acquiring a value at a δ-th decimal place of the distance ratio $r_f''$, and calculating a fragile watermark bit Fit embedded to the distance ratio $r_f''$; comparing the fragile watermark bit $F_{bit}'$ with the fragile watermark bit $F_{bit}''$, when the fragile watermark bit $F_{bit}'$ and the fragile watermark bit $F_{bit}''$ are different, determining that a trajectory point corresponding to the fragile watermark bit $F_{bit}'$ is tampered, recording the trajectory point corresponding to the fragile watermark bit $F_{bit}'$ and a group of the trajectory point corresponding to the fragile watermark bit $F_{bit}'$ to obtain a tampered position.

The present disclosure further provides a non-transitory computer-readable storage medium stored with instructions. When the instructions are executed by a processor, the dual watermarking method for trajectory data based on robust watermarking and fragile watermarking is performed.

Furthermore, although exemplary embodiments have been described in the present disclosure, their scope includes any and all embodiments based on the present disclosure that have equivalent elements, modifications, omissions, combinations (e.g., schemes where various embodiments intersect), adaptations or changes. The elements in the claims will be interpreted broadly based on the language used in the claims, not limited to the embodiments described in this specification or during the implementation period of the present disclosure, and the embodiments are non-exclusive. Therefore, the specification and embodiments are intended to be considered only as examples, and a true scope and spirit are indicated by a full scope of the following claims and their equivalents.

The above description is intended to be explanatory rather than restrictive. For example, the above embodiments (or one or more of them) can be used in combination with each other. For example, those skilled in the art may use other embodiments when reading the above description. In addition, in the above specific embodiments, various features can be grouped together to simplify the present disclosure. This should not be interpreted as a feature of the present disclosure that is necessary for any claim. On the contrary, the subject matter of the present disclosure may be less than all the features of specific embodiments of the present disclosure. Therefore, the following claims are incorporated into specific embodiments as examples or embodiments, where each claim is independently considered as a separate embodiment, and these embodiments may be combined with each other in various combinations or arrangements. The scope of the present disclosure shall be determined by reference to the attached claims and a full scope of the equivalent forms of the claims.

What is claimed is:

1. A dual watermarking method for trajectory data based on robust watermarking and fragile watermarking, comprising:

acquiring a robust watermark;

acquiring a fragile watermark;

embedding the robust watermark, comprising:

based on the robust watermark, setting a preset time threshold and a preset distance threshold for each trajectory of a trajectory dataset; and in response to a time difference between two trajectory points adjacent in time of the trajectory of the trajectory dataset being greater than the preset time threshold or a distance difference between the two trajectory points adjacent in time of the trajectory of the trajectory dataset being greater than the preset distance threshold, segmenting the trajectory into sub-trajectories;

compressing each of the sub-trajectories of the trajectory dataset to obtain feature points of each trajectory of the trajectory dataset, thereby to obtain a feature point set FP of the trajectory dataset, calculating a minimum convex hull of the feature point set FP and obtaining a farthest pair of feature points in the minimum convex hull, setting feature points in the farthest pair of feature points as constant points, taking a feature point of the constant points with a smaller trajectory sequence number as a first constant point $p_f(x_f, y_f)$, and taking another feature point of the constant points as a second constant point $p_s(x_s, y_s)$;

calculating each angle α defined by each feature point except the constant points in the feature point set FP, the first constant point $p_f$, and the second constant point $p_s$; and calculating each distance ratio r defined by each feature point except the constant points in the feature point set FP, the first constant point $p_f$, and the second constant point $p_s$;

using each angle α and each distance ratio r as input values of a hash function to generate an index of a to-be-embedded robust watermark bit of each corresponding feature point except the constant points in the feature point set FP in the robust watermark $W_r$, and acquiring the to-be-embedded robust watermark bit of each corresponding feature point except the constant points in the feature point set FP according to the index; and embedding the to-be-embedded robust watermark bit of each corresponding feature point except the constant points in the feature point set FP into a δ-th decimal place of each angle α; and embedding the fragile watermark, comprising:

calculating each angle defined by each trajectory point of the trajectory dataset, the first constant point $p_f$, and the second constant point $p_s$; calculating each distance ratio defined by each trajectory point of the trajectory dataset, the first constant point $p_f$, and the second constant point $p_s$; combining each angle and each distance ratio to map each angle and each distance ratio on integers [1, k]; and grouping trajectory points of the trajectory dataset with a same mapping value into a corresponding one group to thereby obtain a grouping result $V=\{V_1, \ldots, V_k\}$ of the trajectory points of the trajectory dataset; and wherein k represents the number of groups of the grouping result; and traversing each group of the grouping result I' and embedding the fragile watermark into trajectory points in each group except the constant points.

2. The dual watermarking method for trajectory data based on robust watermarking and fragile watermarking as claimed in claim 1, wherein the acquiring a robust watermark comprises:

acquiring an image with a size of n×n pixels;

encrypting the image to generate an encrypted image I; and converting two-dimensional data of the encrypted image/ to a one-dimensional binary sequence, and taking the one-dimensional binary sequence as the robust watermark expressed as $W_r=\{w_r[i], 0 \leq i \leq j\}$; in the robust watermark, wherein $w_r[i] \in [0,1]$ and j=n*n, and j represents a length of the robust watermark.

3. The dual watermarking method for trajectory data based on robust watermarking and fragile watermarking as claimed in claim 1, wherein the acquiring a fragile watermark comprises:

acquiring coordinates and time of trajectory points of each trajectory of the trajectory dataset;

concatenating the coordinates of the trajectory points of each trajectory of the trajectory dataset and generating integers $S_{cor}$ of the trajectory points of each trajectory of the trajectory dataset;

combining serial numbers and the time of the trajectory points of each trajectory of the trajectory dataset to respectively generate integers $S_{time}$; and taking the integers $S_{cor}$ and the integers $S_{time}$ as parameters of a hash function to generate the fragile watermark.

4. The dual watermarking method for trajectory data based on robust watermarking and fragile watermarking as claimed in claim 1, wherein the traversing each group of the grouping result V' and embedding the fragile watermark into trajectory points in each group except the constant points comprises:

sorting the trajectory points in each of the groups according to a chronological order; and when time of at least two trajectory points of the trajectory points in each of the groups is the same, sorting the at least two trajectory points with the same time of the trajectory points in each group according to an ascending order of trajectory sequence numbers of the at least two trajectory points, to thereby obtain sorted trajectory points in each group;

according to a sorted order of the sorted trajectory points in each of the groups, embedding a fragile watermark bit constructed from a previous trajectory point of the sorted trajectory points into a δ-th decimal place of a distance ratio of a next trajectory point of the sorted trajectory points; and for a first trajectory point of the sorted trajectory points, embedding a fragile watermark bit constructed from a last trajectory point of the sorted trajectory points into a δ-th decimal place of a distance ratio of the first trajectory point of the sorted trajectory points;

wherein a process of embedding a fragile watermark bit into a trajectory point $p_u(x_u, y_u)$ of the sorted trajectory points comprises: calculating a distance ratio $r_f$ between a distance from the trajectory point $p_u$ to the first constant point $p_f$ and a distance from the first constant point $p_f$ to the second constant point $p_s$, and embedding the fragile watermark bit into the distance ratio $r_f$ to obtain a distance ratio $r_f'$.

5. The dual watermarking method for trajectory data based on robust watermarking and fragile watermarking as claimed in claim 1, further comprising: performing watermark detection after embedding the fragile watermark; wherein a process of performing the watermark detection comprises:

compressing each trajectory of the trajectory dataset after embedding the robust watermark and the fragile watermark to obtain a trajectory feature point set; calculating a minimum convex hull of the trajectory feature point set and obtaining a farthest pair of feature points in the minimum convex hull of the trajectory feature point set, setting the farthest pair of feature points of the trajectory feature point set as constant points of the trajectory feature point set, taking a feature point of the constant points of the trajectory feature point set with a smallest trajectory sequence number as a third constant point $p_f'$, and taking another feature point of the constant points of the trajectory feature point set as a fourth constant point $p_s'$;

traversing feature points of the trajectory feature point set to perform robust watermark detection;

calculating each angle defined by each trajectory point of the trajectory dataset after embedding the robust watermark and the fragile watermark, the third constant point $p_f'$, and the fourth constant point $p_s'$; calculating each distance ratio r'' defined by each trajectory point of the trajectory dataset after embedding the robust watermark and the fragile watermark, the third constant point $p_f'$, and the fourth constant point $p_s'$; combining each angle and each distance ratio to map each angle and each distance ratio on integers [1, k]; and grouping trajectory points of the trajectory dataset after embedding the robust watermark and the fragile watermark with a same mapping value into a corresponding one group to thereby obtain a grouping result $V'=\{V_1', \ldots, V_k'\}$ of the trajectory points of the trajectory dataset after embedding the robust watermark and the fragile watermark; and traversing each group of the group result V' to perform fragile watermark detection.

6. The dual watermarking method for trajectory data based on robust watermarking and fragile watermarking as claimed in claim 5, wherein the traversing feature points of the trajectory feature point set to perform robust watermark detection comprises:

calculating each angle $\alpha''$ defined by each feature point in the trajectory feature point set, the third constant point $p_f'$, and the fourth constant point $p_s'$; and calculating each distance ratio $r''$ defined by each feature point in the trajectory feature point set, the third constant point $p_f'$, and the fourth constant point $p_s'$;

calculating an index index' of a robust watermark bit of each corresponding feature point based on each angle $\alpha''$ and each distance ratio $r''$;

extracting the robust watermark bit of each corresponding feature point in the robust watermark embedded into a $\delta$-th decimal place of each angle $\alpha''$ based on quantization index modulation technology;

performing a majority voting method based on the index index' of the robust watermark of each corresponding feature point and the robust watermark bit of each corresponding feature point to obtain an extracted robust watermark $W_r'$; and comparing a similarity between the robust watermark $W_r$ and the extracted robust watermark $W_r'$, and selecting a normalized correlation coefficient as an evaluation indicator; and when the normalized correlation coefficient is greater than or equal to 0.75, determining that data corresponding to the extracted robust watermark $W_r'$ is the same with data corresponding to the robust watermark $W_r$.

7. The dual watermarking method for trajectory data based on robust watermarking and fragile watermarking as claimed in claim 5, wherein a process of performing the fragile watermark detection comprises:

sorting the trajectory points in each group corresponding to the trajectory dataset after embedding the robust watermark and the fragile watermark according to a chronological order; and when time of at least two trajectory points of the trajectory points in each of the groups corresponding to the trajectory dataset after embedding the robust watermark and the fragile watermark is the same, sorting the at least two trajectory points with the same time of the trajectory points according to an ascending order of trajectory sequence numbers of the at least two trajectory points;

calculating a fragile watermark bit $F_{bit}'$ and a distance ratio $r''$ detected at each of the trajectory points in each group corresponding to the trajectory dataset after embedding the robust watermark and the fragile watermark; and acquiring a value at a $\delta$-th decimal place of the distance ratio $r_f''$, and calculating a fragile watermark bit $F_{bit}''$ embedded to the distance ratio $r_f''$; comparing the fragile watermark bit $F_{bit}'$ with the fragile watermark bit $F_{bit}''$, when the fragile watermark bit $F_{bit}'$ and the fragile watermark bit $F_{bit}''$ are different, determining that a trajectory point corresponding to the fragile watermark bit $F_{bit}'$ is tampered, recording the trajectory point corresponding to the fragile watermark bit $F_{bit}'$ and a group of the trajectory point corresponding to the fragile watermark bit $F_{bit}'$ to obtain a tampered position.

8. A dual watermarking device for trajectory data based on robust watermarking and fragile watermarking, comprising:

a first acquiring part, configured to acquire a robust watermark;

a second acquiring part, configured to acquire a fragile watermark;

a first embedding part, configured to embed the robust watermark; wherein a process of embedding the robust watermark by the first embedding part comprises:

based on the robust watermark, setting a preset time threshold and a preset distance threshold for each trajectory of a trajectory dataset; and in response to a time difference between two trajectory points adjacent in time of the trajectory of the trajectory dataset being greater than the preset time threshold or a distance difference between the two trajectory points adjacent in time of the trajectory of the trajectory dataset being greater than the preset distance threshold, segmenting the trajectory into sub-trajectories;

compressing each of the sub-trajectories of the trajectory dataset to obtain feature points of each trajectory of the trajectory dataset, thereby to obtain a feature point set FP of the trajectory dataset, calculating a minimum convex hull of the feature point set FP and obtaining a farthest pair of feature points in the minimum convex hull, setting feature points in the farthest pair of feature points as constant points, taking a feature point of the constant points with a smaller trajectory sequence number as a first constant point $p_f(x_f, y_f)$, and taking another feature point of the constant points as a second constant point $p_s(x_s, y_s)$;

calculating each angle $\alpha$ defined by each feature point except the constant points in the feature point set FP, the first constant point $p_f$, and the second constant point $p_s$; and calculating each distance ratio $r$ defined by each feature point except the constant points in the feature point set FP, the first constant point $p_f$, and the second constant point $p_s$;

using each angle $\alpha$ and each distance ratio $r$ as input values of a hash function to generate an index of a to-be-embedded robust watermark bit of each corresponding feature point except the constant points in the feature point set FP in the robust watermark $W_r$, and acquiring the to-be-embedded robust watermark bit of each corresponding feature point except the constant points in the feature point set/P according to the index; and embedding the to-be-embedded robust watermark bit of each corresponding feature point except the constant points in the feature point set FP into a $\delta$-th decimal place of each angle $\alpha$; and a second embedding part, configured to embed the fragile watermark; wherein a process of embedding the fragile watermark by the second embedding part comprises:

calculating each angle defined by each trajectory point of the trajectory dataset, the first constant point $p_f$, and the second constant point $p_s$; calculating each distance ratio defined by each trajectory point of the trajectory dataset, the first constant point $p_f$, and the second constant point $p_s$; combining each angle and each distance ratio to map each angle and each distance ratio on integers [1, k]; and grouping trajectory points of the trajectory dataset with a same mapping value into a corresponding one group to thereby obtain a grouping result $V=\{V_1, \ldots, V_k\}$ of the trajectory points of the trajectory dataset, and k represents the number of groups of the grouping result; and traversing each group of the grouping result V and embedding the fragile watermark into trajectory points in each group except the constant points.

9. The dual watermarking device for trajectory data based on robust watermarking and fragile watermarking as claimed in claim 8, further comprising: a watermark detection part configured to perform watermark detection; wherein a process of performing the watermark detection by the watermark detection part comprises:

compressing each trajectory of the trajectory dataset after embedding the robust watermark and the fragile watermark to obtain a trajectory feature point set; calculating a minimum convex hull of the trajectory feature point set and obtaining a farthest pair of feature points in the minimum convex hull of the trajectory feature point set, setting the farthest pair of feature points of the trajectory feature point set as constant points of the trajectory feature point set, taking a feature point of the constant points of the trajectory feature point set with a smallest trajectory sequence number as a third constant point $p_f'$, and taking another feature point of the constant points of the trajectory feature point set as a fourth constant point $p_s'$;

traversing feature points of the trajectory feature point set to perform robust watermark detection;

calculating each angle defined by each trajectory point of the trajectory dataset after embedding the robust watermark and the fragile watermark, the third constant point $p_f'$, and the fourth constant point $p_s'$; calculating each distance ratio $r''$ defined by each trajectory point of the trajectory dataset after embedding the robust watermark and the fragile watermark, the third constant point $p_f'$, and the fourth constant point $p_s'$; combining each angle and each distance ratio to map each angle and each distance ratio on integers [1, k]; and grouping trajectory points of the trajectory dataset after embedding the robust watermark and the fragile watermark with a same mapping value into a corresponding one group to thereby obtain a grouping result $V' = \{V_1', \ldots, V_k'\}$ of the trajectory points of the trajectory dataset after embedding the robust watermark and the fragile watermark; and traversing each group of the group result $V'$ to perform fragile watermark detection.

10. A non-transitory computer-readable storage medium stored with instructions, wherein when the instructions are executed by a processor, the dual watermarking method for trajectory data based on robust watermarking and fragile watermarking as claimed in claim 1 is performed.

* * * * *